United States Patent [19]

Simard

[11] Patent Number: 5,731,981
[45] Date of Patent: Mar. 24, 1998

[54] BEVERAGE DISPENSING SYSTEM FOR BAR

[75] Inventor: Gilbert Simard, Beauport, Canada

[73] Assignee: Azbar, Inc., Vanier, Canada

[21] Appl. No.: 894,269

[22] Filed: Jun. 8, 1992

[51] Int. Cl.⁶ ............................... B67D 5/10; B67D 5/14; B67D 5/30
[52] U.S. Cl. .............. 364/465; 137/897; 222/52; 222/59; 222/129.3; 222/129.4; 222/144.5; 235/94 R; 235/94 A; 364/479
[58] Field of Search .................... 137/893, 897; 222/52, 59, 129.3, 129.4, 144.5, 129.2; 235/94 R, 94 A; 364/465, 479

[56] References Cited

U.S. PATENT DOCUMENTS

| | | | |
|---|---|---|---|
| 3,428,218 | 2/1969 | Felix | 222/23 |
| 3,685,692 | 8/1972 | Erne et al. | 222/23 |
| 3,830,405 | 8/1974 | Jaeger | 235/94 R X |
| 3,884,391 | 5/1975 | Pauliukonis | 222/129.4 |
| 3,920,149 | 11/1975 | Fortino et al. | 221/1 |
| 3,940,019 | 2/1976 | Kross et al. | 222/129.4 X |
| 4,162,028 | 7/1979 | Reichenberger | 222/129.4 |
| 4,237,536 | 12/1980 | Enelow et al. | 364/465 |
| 4,624,391 | 11/1986 | Shannon | 222/129 X |
| 4,873,877 | 10/1989 | Harris | 73/864.16 |
| 4,998,866 | 3/1991 | Harris | 417/460 |
| 5,279,448 | 1/1994 | Hanlin et al. | 222/132 |

FOREIGN PATENT DOCUMENTS

| | | |
|---|---|---|
| 2815610 | 10/1979 | Germany. |
| 2116763 | 9/1983 | United Kingdom. |

*Primary Examiner*—Edward R. Cosimano
*Attorney, Agent, or Firm*—Quarles & Brady

[57] ABSTRACT

The system controls the dispensing of beverages in a bar. The system has individual manually actuated beverage dispensers equipped with electrically controlled flow valve devices which meter and dispense variable amounts of beverages upon command by a user. The system is provided with a key pad offering a selection of beverage mixes. A control device is connected to the beverage dispensers and the key pad for recording use of the beverage dispensers by the user, and for causing the flow valve devices of the dispensers used to make up a beverage mix selected on the key pad to dispense the amounts of beverage prescribed for the selected beverage mix. The controller provides for a controlled use of the beverage dispensers for preparing a beverage mix selected on the key pad in addition to a direct manual use of the beverage dispensers by the user. An anti-tamper circuit for use with coded electromagnetic valve bottle stoppers is also included in the system to detect magnetic fields in the vicinity of the coded electromagnetic valve bottle stoppers and trigger an alarm indicating possible fraudulent dispensation of liquor.

11 Claims, 2 Drawing Sheets

BEVERAGE DISPENSING SYSTEM FOR BAR

FIELD OF THE INVENTION

The present invention relates to a system for controlling the dispensing of beverages in a bar. The invention relates further to such a system in which a mixed drink can be selected. The invention also relates to an anti-tamper system for use with coded electromagnetic valve bottle stoppers and activating coil means.

BACKGROUND OF THE INVENTION

Bar control systems are known in the art. U.S. Pat. No. 3,920,149 (Fortino et al.) describes a liquor bottle stopper and electromagnetic valve system which records use of up to seven different kinds of liquor. UK patent 2,116,763 describes a bar system in which consumption of various beverages are monitored and controlled by a central system. It is also known to provide apparatus which automatically prepare a mixed drink.

While these prior art systems can be used to effectively monitor beverage consumption in a bar for inventory and cost purposes or to prepare a mixed drink, they do not assist the bartender in his preparation of drinks, while allowing him to serve drinks of a variety of kinds from a variety of dispensers or containers.

For example, a bar may have a wine dispenser and a soda dispenser. Each dispenser may be metered to monitor consumption for inventory and cost purposes. When a customer requests a glass of wine or a glass of soda water, the dispensers are used directly by the bartender, and charged accordingly. However, when the customer wants a spritzer (wine and soda mix), a smaller quantity of wine is mixed with a smaller quantity of soda to make up the mixed drink. In the prior art systems, consumption of the beverages is monitored without regard to how the beverages are used to determine what revenue should be generated from the loss in inventory for each separate case (the Cost per once for the wine is more in a spritzer than in a simple glass).

SUMMARY OF THE INVENTION

It is an object of the invention to provide a system for controlling the dispensing of beverages in a bar, which monitors consumption and estimates revenue from the consumption. It is another object of the invention to provide a system which works with a plurality of individually operated beverage dispensers for metering and dispensing a plurality of beverages, so that the bartender may dispense in the conventional manner any of the beverages to make up a drink.

According to the invention, there is provided a system for controlling the dispensing of beverages in a bar, comprising: a plurality of individual manually operated beverage dispensers for metering and dispensing a plurality of beverages upon command by a user; selecting means for selecting a preprogrammed beverage mix by the user; and control means for controlling the plurality of beverage dispensers to dispense preprogrammed quantities of beverage making up the selected preprogrammed beverage mix when the selecting means indicate that a mix has been selected; whereby the system allows the user to obtain quantities of beverages by use of the plurality of beverage dispensers without using the selecting means and to prepare a preprogrammed beverage mix by using the selecting means and the plurality of beverage dispensers.

Preferably, the system may further comprise calculating means for determining an estimated value of the beverages dispensed, based on metered quantities of the beverages dispensed and the state of the selection means, whereby a different value per volume of the beverages may be calculated for a given beverage making up the selected preprogrammed beverage mix. The calculating means may also function as a cash register, the selecting means providing a cash register input. A printer connected to the calculating means can provide cash register receipts.

The invention also provides anti-tamper system for use with coded electromagnetic valve bottle stoppers and activating coil means, the system comprising a magnet detection circuit for producing an output signal in response to a movement of a magnet, said circuit to be located proximate said bottle stoppers and said activating coil means, and control means for controlling the activator coil means and for generating a tamper alarm signal when the activator coil means are not activated and the detection circuit produces said output signal.

DETAILED DESCRIPTION OF THE PREFERRED EMBODIMENT

Figure 1:
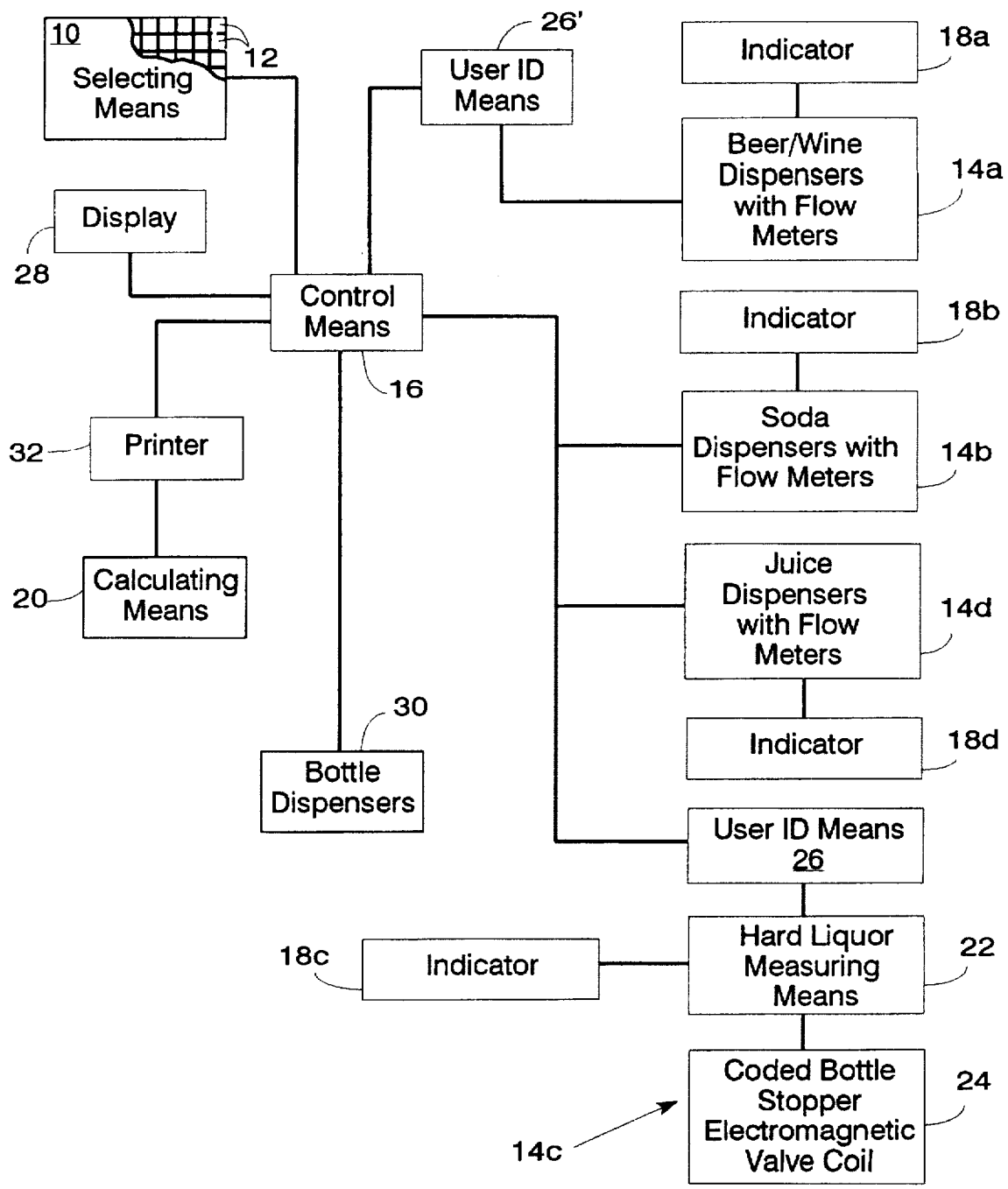
FIG. 1 is a block diagram of the system according to the preferred embodiment.

In the preferred embodiment, the system for controlling the dispensing of beverages in a bar comprises a central control means (16) which cooperates with the plurality of individual manually operated beverage dispensers (14a) (14b) (14c) and (14d) for metering and dispensing a plurality of beverages upon command by a user. As dispensers (14) are used, the control means (16) are provided with information concerning how much of each beverage is dispensed. The beer and wine flow meters (14a) measure the amount of beer or wine dispensed from the various beer and wine taps of the bar system. Similarly, the soda flow meters (14b) are connected to each soda supply line for each kind of soda to measure dispensation. Juice dispensers (14d) are also connected to the control means (16). The hard liquor dispensers (14c) comprise hard liquor measuring means (22) and a coded bottle stopper electromagnetic valve activator coil (24). A coded bottle stopper electromagnetic valve system and activator coil are known in the art from U.S. Pat. No. 3,920,149. Each bottle of hard liquor is provided with a bottle stopper having therein a magnetically activated valve which is normally closed to prevent pouring of the hard liquor. Coding means are also provided on the stopper to identify the bottle. An activator coil (24) is placed over the coded bottle stopper, and then the coil stopper and bottle are all inverted to pour the hard liquor. The measuring means (22) then cause the activator coil (24) to open the electromagnetic valve and do so for a predetermined period of time such that the predetermined quantity to be measured is poured from the bottle of hard liquor. Measuring means (22) feed back to control means (16) how much liquor has been poured from which bottle as identified by the coded stopper. As can be understood, the above-described system can be used to dispense beer, wine, soda and hard liquor at the bartender's command while the control means (16) can be used for measuring the quantities of beverages dispensed.

The control means (16) can also be used to measure exact amounts of beer, wine and soda to be measured by adding to flow meters (14a) and (14b) solenoid valves which stop the flow of beer, wine and soda once a predetermined amount of beverage has been dispensed as measured by the flow meters.

In accordance with the invention, selecting means (10) are provided for selecting a beverage mix whose various component beverages dispensable from dispensers (14) are determined and measured for dispensation by control means (16) in collaboration with the dispensers (14). A given mixed drink may be selected by pressing one of keys (12) on a key pad of the selecting means (10). If the mixed beverage selected should be a wine spritzer, a preselected amount, such as 3.5 ounces, of wine and soda respectively will be dispensed from dispensers (14a) and (14b). Selecting means (10) will inform control means (16) of the appropriate amounts to be dispensed and control means (16) will control dispensers (14a) and (14b) to carry out the appropriate dispensations. Meanwhile, indicators (18a) and (18b) will indicate that a preselected amount will be dispensed by dispensers (14a) and (14b) respectively, and that to dispense from the dispensers a different measurement would require resetting of the selecting mean (10). In the preferred embodiment, the indicators (18a), (18b), (18c) and (18d) comprise LED's fixed proximate the controls for each of the dispensers (14). Thus, in the case of a wine spritzer, the white wine tap of dispensers (14a) will be set to measure 3.5 ounces before stopping. Indicator (18a) fixed proximate the white wine tap will flash to indicate that a preprogammed amount will be dispensed. Once the appropriate amount of wine has been dispensed into a glass, the bartender then picks up the soda gun of dispensers (14b) to which an LED indicator (18b) is attached. The indicator (18b) would be flashing to indicate that a predetermined measured amount will be dispensed. The bartender presses the soda water button until the flow is stopped and the glass is filled. Once the predetermined amounts are dispensed from dispensers (14a) and (14b), the indicators (18a) and (18b) respectively will be reset to their normal state.

In another example, if a mixed drink such as a Harvey Wallbanger is selected using selecting means (10), the control means (16) will control dispensers (14c) to measure the correct amounts of vodka and Galiano (trademark) liquor to make up the mixed beverage with a remaining amount of orange juice. When the coil (24) is placed on top of the coded bottle stopper of either the Galiano or vodka bottles, the control means (16) recognize that one of the bottles for making up a selected mix is ready for use, and causes indicator (18c) to flash. Once the measuring means (22) determine that the selected quantities of each hard liquor has been dispensed, the activator coils are caused to close the electromagnetic valves and stop pouring. The glass containing the appropriately measured quantities of vodka and Galiano is then filled with orange juice either from a dispenser similar to dispensers (14a) and (14b) (not shown) or by pouring from an ordinary juice container. Calculating means (20) keep track of the total value of beverages dispensed for accounting purposes in the bar. As can be understood, in the case that a wine spritzer is sold at the same price as a glass of wine, the two drinks containing different amounts of wine, then the calculating means (20) will rely on information provided by the selecting means (10) to adjust the value per volume rates for the various beverages depending on its application.

In the preferred embodiment, there is also provided user identification means (26) and (26') which may optionally be implemented to prevent unauthorized dispensation of beverages and to identify which bartender has dispensed beverages. Once the user has identified himself by means (26) and (26'), control means (16) may pass this information on to calculating means (20) in order to keep separate tabs on the total value of beverages dispensed. The means (26) and (26') may comprise a key actuated switch or a security code entry keypad. In the case of a bar in which the bartender is responsible for his or her own cash, the calculating means will indicate whether each bartender has collected an amount of cash commensurate with the value of the beverages dispensed.

In the preferred embodiment, a display (28) is also provided which can be used to display a list of beverage ingredients making up the beverage mix selected by the selecting means (10) so that the bartender knows in advance what ingredients are required. Printer (32) may be used to print up bills and to produce reports on the value of beverages dispensed determined by the calculating means. Inventory control and inventory reports may also be generated by printer (32). A bottle dispenser (30) is also provided so that inventory and sales control for all beverages sold by the bar can be accounted for by the control means (16) and the calculating means (20).

The calculating means also act as a cash register in combination with the selecting means (10) and the printer (32). All items for sale at the bar (even snacks and cigarettes) are assigned a key (12) on the means (10), and the sale is displayed on display (28). When a receipt is required, printer (32) is used to print up the required detailed receipt.

Figure 2:
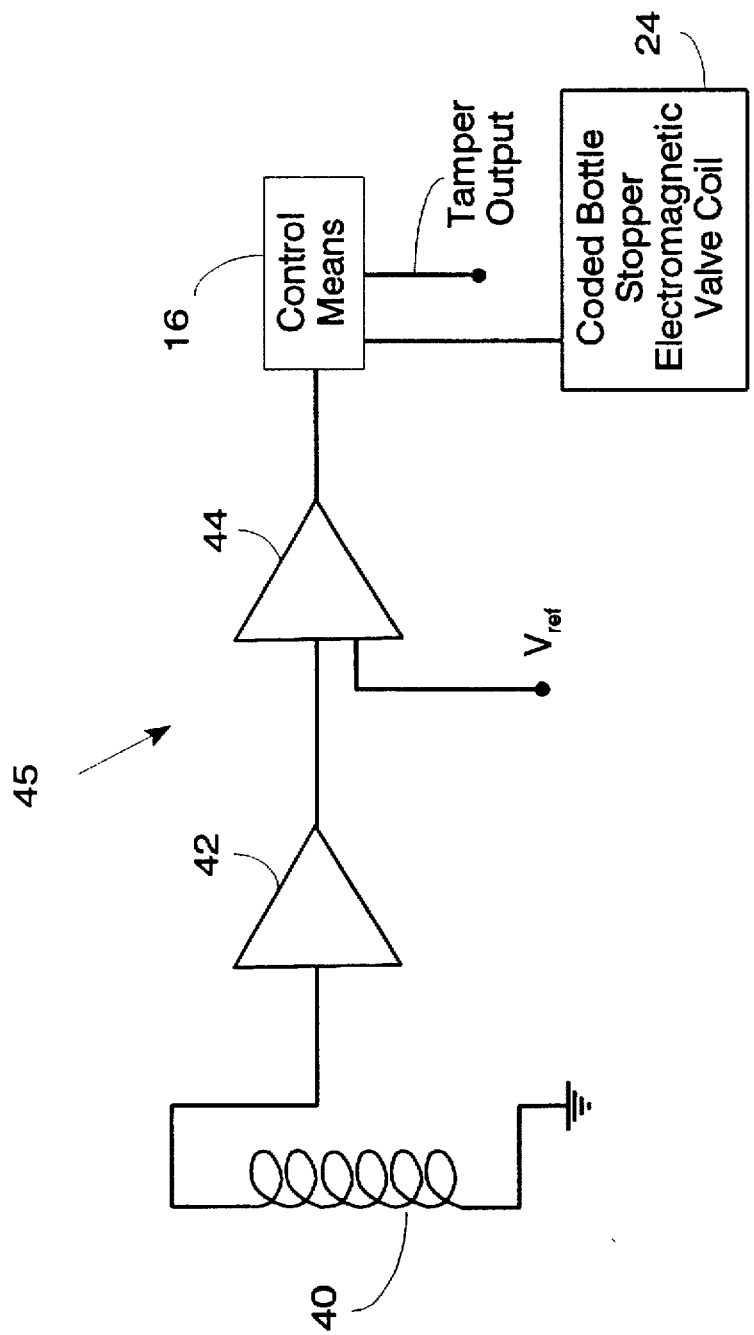
FIG. 2 is a block diagram of a magnetic field detection circuit used to detect the presence of a tampering magnet, which can be used to open an electromagnetic valve bottle stopper.

As shown in FIG. 2, the invention also provides a magnet detection circuit (45) which comprises a detecting coil (40), an amplifier (42) and a comparator (44) which outputs a signal when the amplified signal from the coil rises above a threshold reference voltage. Any movement of a magnet in the vicinity of coil (40) will generate a signal sufficient to cause an output from comparator (44). The output signal is fed to the control means (16) which carries out two kinds of monitoring of the output signal of the circuit (45). First, if the movement of a magnet is detected when the coil (24) is not activated (see FIG. 1), then a tamper alarm is generated. Such would be the case if a small permanent magnet were to be used to open one of the coded bottle stopper electromagnetic valves in order to pour a drink while bypassing the control means. Secondly, it is optionally possible to check that an output signal is indeed produced by circuit (45) each time the activator coil (24) is energized, in order to make sure that the coil (40) has not been tampered with. Advantageously, the coil (40) is mounted out of sight in close proximity to the activator coil (24) under a bar counter on which the hard liquor measuring means (22) and the activator coil (24) are mounted.

What is claimed is:

1. A system for controlling the dispensing of beverages in a bar, comprising:

a plurality of individual manually actuated beverage dispensers including electrically controlled flow valve means for metering and dispensing a variable amount of a plurality of beverages upon command by a user;

selecting means for selecting a preprogrammed beverage mix upon selection by the user; and control means connected to said beverage dispensers and said selecting means for recording use of said plurality of individually manually actuated beverage dispensers by said user, and for causing the flow valve means of the dispensers used to make up a beverage mix selected on said selecting means to dispense the amounts of beverage prescribed for said beverage mix;

whereby the controller provides for an assisted use of the beverage dispensers for preparing a beverage mix selected on said selecting means in addition to a direct manual use of the beverage dispensers by said user.

2. The system as defined in claim 1, wherein the selecting means comprise a keypad having an input key for each beverage mix.

3. The system as defined in claim 1, wherein said control means function as a cash register, the selecting means providing to said control means details of an order of beverages.

4. The system as defined in claim 1, further comprising a plurality of indicators connected to said control means and associated with said beverage dispensers for indicating when the control means have set the preprogrammed ones of the plurality of beverage dispensers to dispense preprogrammed quantities of beverage making up the selected preprogrammed beverage mix, such that the user is aware that the beverage dispensers whose indicators are active will dispense the preprogrammed quantity as controlled by the control means.

5. The system as defined in claim 4, wherein the indicators each comprise an LED.

6. The system as defined in claim 1, further comprising calculating means for determining a value of the beverages dispensed, based on recorded use of said plurality of said beverage dispensers and said selections made by said user, wherein different values per volume of the beverages dispensed for preprogrammed beverage mixes are taken into account.

7. The system as defined in claim 6, further comprising user identification means for preventing unauthorized use of the beverage dispensers and for allowing the calculating means to determine the value of beverages dispensed for each of a plurality of users.

8. The system as defined in claim 1, wherein the plurality of beverage dispensers comprise coded electromagnetic valve bottle stoppers and an activating coil means.

9. The system as defined in claim 8, wherein said control means comprise measuring means for selecting a predetermined quantity to be dispensed by said stoppers and for timing operation of said activating coil means, whereby predetermined measured quantities of beverages can be dispensed without using the selection means.

10. The system as defined in claim 8, further comprising a magnet detection circuit for producing an output signal in response to a movement of a magnet near said stoppers and said activating coil means, said detection circuit including a detection coil located near said stoppers and said activating coil means, the control means producing a tamper alarm signal when said output signal is detected in the absence of said activator coil means being energized.

11. An anti-tamper system for use with coded electromagnetic valve bottle stoppers and activating coil means, the system comprising:

a magnet detection circuit for producing an output signal in response to a movement of a magnet, near said stoppers and said activating coil means, said circuit comprising a detection coil located proximate said bottle stoppers and said activating coil means; and control means for controlling the activator coil means and for generating a tamper alarm signal when the activator coil means are not activated and the detection circuit produces said output signal.

* * * * *